(12) United States Patent
Yahata et al.

(10) Patent No.: US 9,488,082 B2
(45) Date of Patent: Nov. 8, 2016

(54) REDUCING AGENT SUPPLYING DEVICE

(71) Applicant: DENSO CORPORATION, Kariya, Aichi-pref. (JP)

(72) Inventors: Shigeto Yahata, Toyoake (JP); Masumi Kinugawa, Okazaki (JP); Yuuki Tarusawa, Kariya (JP); Mao Hosoda, Kariya (JP); Yusuke Majima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/857,181

(22) Filed: Sep. 17, 2015

(65) Prior Publication Data
US 2016/0084130 A1   Mar. 24, 2016

(30) Foreign Application Priority Data

Sep. 18, 2014 (JP) ................. 2014-190155

(51) Int. Cl.
*F01N 3/00* (2006.01)
*F01N 5/04* (2006.01)
(Continued)

(52) U.S. Cl.
CPC ......... *F01N 3/0842* (2013.01); *B01D 53/9431* (2013.01); *B01D 53/9495* (2013.01);
(Continued)

(58) Field of Classification Search
CPC .......... F01N 2240/16; F01N 2240/30; F01N 2240/38; F01N 2560/06; F01N 2560/08; F01N 2570/14; F01N 2610/03; F01N 2610/08; F01N 2610/085; F01N 2900/1406; F01N 2900/1602; F01N 3/0814; F01N 3/0842; F01N 3/0871; F01N 3/2066; F01N 3/303; F01N 3/32; B01D 2251/104; B01D 53/9431; F02B 37/164

USPC .................................. 60/275, 280, 286, 303
See application file for complete search history.

(56) References Cited

U.S. PATENT DOCUMENTS 6,363,716 B1 * 4/2002 Balko ................ B01D 53/9431
422/183
6,739,125 B1 * 5/2004 Mulligan .............. F01N 3/2073
123/1 A (Continued)

FOREIGN PATENT DOCUMENTS

EP         2 966 274      1/2016
JP         2000-54833     2/2000

OTHER PUBLICATIONS

European Search Report (8 pages) dated Feb. 16, 2016, issued in corresponding European Application No. 15184973.4.

*Primary Examiner* — Thomas Denion
*Assistant Examiner* — Diem Tran
(74) *Attorney, Agent, or Firm* — Nixon & Vanderhye P.C.

(57) ABSTRACT

A reducing agent supplying device includes a reaction container, an ozone generator, an air pump, an ozone-containing air pipe, a compressed air pipe, a switching device, and a switching controller. The reaction container defines a reaction chamber therein in which a reducing agent is reformed. The ozone generator generates ozone from oxygen in air. The air pump supplies air into the ozone generator. An ozone-containing air flows through the ozone-containing air pipe toward the reaction chamber. A portion of a compressed air flows through the compressed air pipe toward the reaction chamber. The switching device switches between an air pump mode, in which the ozone-containing air is supplied into the reaction chamber, and a supercharging mode, in which the compressed air is supplied into the reaction chamber. The switching controller controls the switching device based on a catalyst temperature, which is a temperature of the reducing catalyst, and an exhaust pressure, which is a pressure in the exhaust passage.

5 Claims, 5 Drawing Sheets

(51) Int. Cl.
*F01N 3/10* (2006.01)
*F01N 3/08* (2006.01)
*F01N 3/20* (2006.01)
*B01D 53/94* (2006.01)
*F01N 3/30* (2006.01)
*F01N 3/32* (2006.01)
*F02B 37/16* (2006.01)
*F01N 13/00* (2010.01)

(52) U.S. Cl.
CPC .......... *F01N3/0814* (2013.01); *F01N 3/0871* (2013.01); *F01N 3/2066* (2013.01); *F01N 3/303* (2013.01); *F01N 3/32* (2013.01); *B01D 2251/104* (2013.01); *F01N 13/0097* (2014.06); *F01N 2240/16* (2013.01); *F01N 2240/30* (2013.01); *F01N 2240/38* (2013.01); *F01N 2260/26* (2013.01); *F01N 2560/06* (2013.01); *F01N 2560/08* (2013.01); *F01N 2570/14* (2013.01); *F01N 2610/03* (2013.01); *F01N 2610/08* (2013.01); *F01N 2610/085* (2013.01); *F01N 2900/1406* (2013.01); *F01N 2900/1602* (2013.01); *F02B 37/164* (2013.01)

(56) References Cited

U.S. PATENT DOCUMENTS

| | | | |
|---|---|---|---|
| 7,409,823 B2 | 8/2008 | Price et al. | |
| 7,484,358 B2* | 2/2009 | Cho | C10L 1/02 60/274 |
| 7,891,171 B2* | 2/2011 | Cho | B01J 23/50 60/274 |
| 9,145,805 B2* | 9/2015 | Sato | B01D 53/9409 |
| 2005/0011184 A1 | 1/2005 | Price et al. | |
| 2006/0063046 A1* | 3/2006 | Hu | B60L 11/1881 429/414 |

\* cited by examiner

REDUCING AGENT SUPPLYING DEVICE

CROSS REFERENCE TO RELATED APPLICATION

This application is based on and incorporates herein by reference Japanese Patent Application No. 2014-190155 filed on Sep. 18, 2014.

TECHNICAL FIELD

The present disclosure relates to a reducing agent supplying device for supplying a reducing agent used for NOx reduction into an exhaust passage at a position upstream of a reducing catalyst.

BACKGROUND

A patent literature 1 (JP 2000-54833 A) disclosed a reducing agent supplying device that includes an ozone generator for generating an ozone, an air pump for blowing an air containing the ozone generated by the ozone generator, a fuel injector for injecting a fuel as a reducing agent, and a heater. A mixed air of the blown air and the injected fuel is heated by the heater, whereby the fuel is oxidized with oxygen in air, i.e., the fuel is reformed. The reformed fuel is supplied into an exhaust passage at a position upstream of a NOx catalyst to reduce NOx in the existence of the NOx catalyst, thereby purifying the NOx contained in exhaust gas. It should be noted that since the air contains the ozone, oxidation reaction of the fuel is accelerated, thereby improving a purifying rate for the NOx.

A patent literature 2 (US 2005/0011184 A) discloses a reducing agent supplying device includes a branch pipe through which a portion of intake air compressed by a supercharger flows from an intake pipe. The air taken by the branch pipe is blown by the air pump to be mixed with a fuel, thereby reforming the fuel.

However, there is a concern for the device according to the patent literature 1, as described below. When a pressure in the exhaust passage (i.e., exhaust pressure) is high during, for example, high engine load operation, the air pump may fail to supply the mixed air into the exhaust passage due to lack of a discharge pressure of the air pump.

In regards to the above-described concern, since the air compressed by the supercharger is blown by the air pump according to the device disclosed in the patent literature 2, the mixed air may be supplied into the exhaust passage even when the exhaust pressure is high. However, since the intake air may contain dust of, e.g., blow-by gas or internal EGR gas, there may be a concern that a failure occurs in the air pump due to the dust because the air pump according to the device of the patent literature 2 blows the intake air to the air pump. Especially, when the ozone is mixed with air to improve the NOx purifying rate, a failure may also occur in an ozone generator due to the dust.

SUMMARY

It is an objective of the present disclosure to provide a reducing agent supplying device that may improve a NOx purifying rate with ozone and supply a reducing agent into an exhaust passage even when exhaust pressure in the exhaust passage is high while suppressing pollution of an air pump.

In an aspect of the present disclosure, a reducing agent supplying device is for a fuel combustion system. The fuel combustion system includes a supercharger, which compresses an air and supplies the air to an internal combustion engine, and a NOx purifying device, which is arranged in an exhaust passage to purify, with a reducing catalyst, NOx contained in exhaust gas of the internal combustion engine. The reducing agent supplying device supplies a reducing agent into the exhaust passage at a position upstream of the reducing catalyst. The reducing agent supplying device includes a reaction container, an ozone generator, an air pump, an ozone-containing air pipe, a compressed air pipe, a switching device and a switching controller. The reaction container defines a reaction chamber therein in which the reducing agent is reformed by being oxidized with oxygen in air. The ozone generator generates ozone from oxygen in air. The air pump supplies air into the ozone generator. An ozone-containing air, which is an air containing the ozone generated by the ozone generator, flows through the ozone-containing air pipe toward the reaction chamber. A portion of a compressed air, which is the air compressed by the supercharger, flows through a compressed air pipe toward the reaction chamber. The switching device switches between an air pump mode, in which the ozone-containing air is supplied into the reaction chamber, and a supercharging mode, in which the compressed air is supplied into the reaction chamber. The switching controller controls the switching device based on a catalyst temperature, which is a temperature of the reducing catalyst, and an exhaust pressure, which is a pressure in the exhaust passage.

According to the aspect of the present disclosure, the ozone-containing air pipe for introducing the ozone-containing air into the reaction chamber and the compressed air pipe for introducing the compressed air into the reaction chamber are separately provided. The air pump and the ozone generator are disposed in the ozone-containing air pipe to be separated from the compressed air pipe. Thus, it is possible to suppress the pollution of the air pump and the ozone generator by dusts contained in intake air.

Furthermore, the switching device and the switching controller are provided in the aspect of the present disclosure. Therefore, when a pressure in the exhaust passage (i.e., an exhaust pressure) is high so that supply of the reducing agent into the exhaust passage is not possible, the switching controller controls the switching device to switch to the supercharging mode to supply the reducing agent reformed in the reaction chamber into the exhaust passage. On the contrary, when the exhaust pressure is low so that the supply of the reducing agent is possible and when the reducing catalyst has a temperature at which an improvement in the NOx purification rate by ozone is expected, the switching controller controls the switching device to switch to the air pump mode to supply the reducing agent reformed with the ozone-containing air into the exhaust passage.

As described above, according the aspect of the present disclosure, the NOx purification rate may be improved. Furthermore, even when the exhaust pressure is high, it is possible to supply the reducing agent into the exhaust passage while suppressing the pollution of the air pump and the ozone generator.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
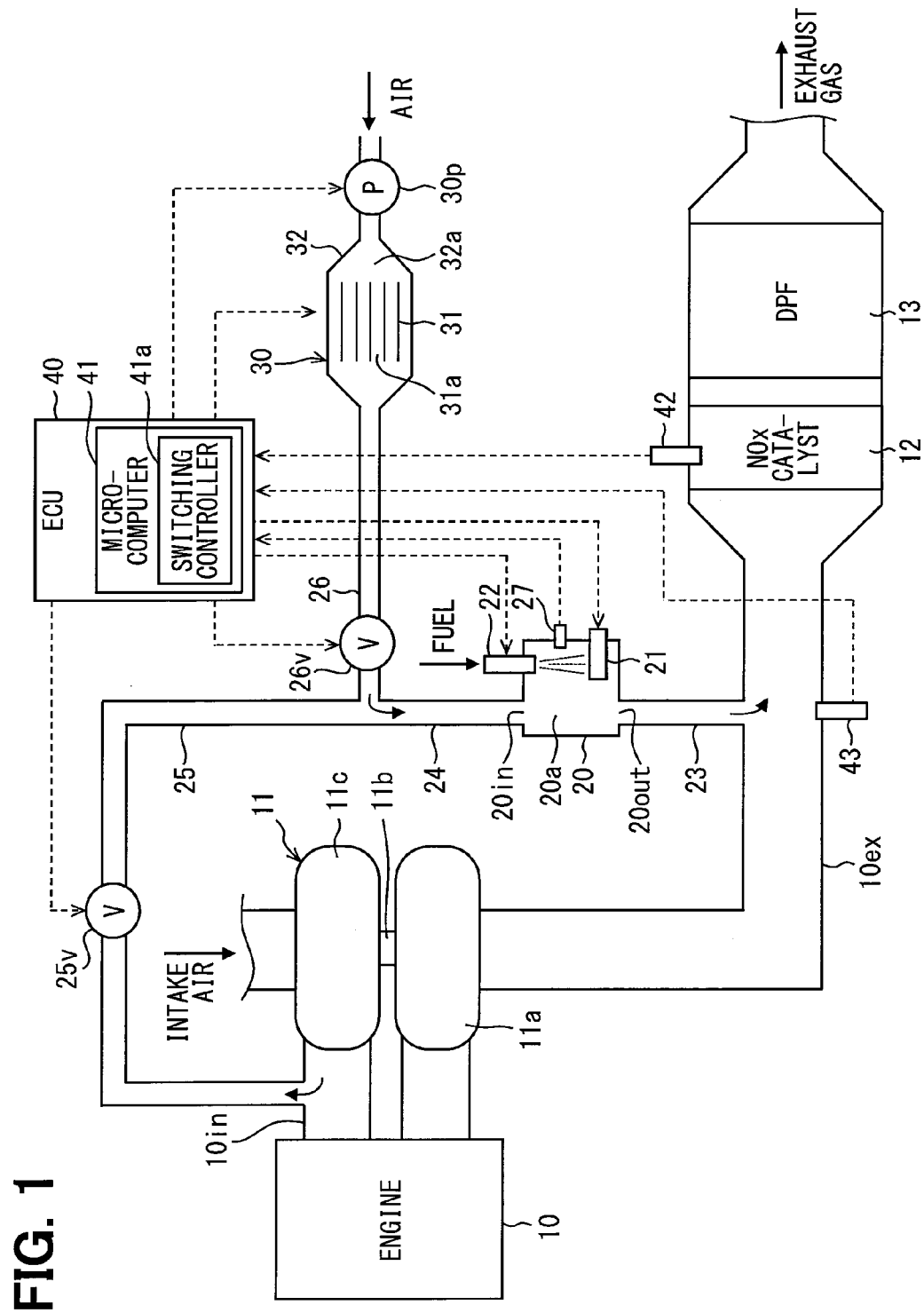
FIG. 1 is a schematic view of a reducing agent supplying device applied to a combustion system.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

A combustion system as illustrated in FIG. 1 includes an internal combustion engine 10, a supercharger 11, a NOx purifying device 12, a diesel particulate filter (DPF 13), and a reducing agent supplying device. The combustion system is mounted on a vehicle and the vehicle is powered by an output from the internal combustion engine 10. In the present embodiment, the internal combustion engine 10 is a compression self-ignition diesel engine and diesel fuel (light oil), which is hydrocarbon compound, is used as a fuel for combustion. The internal combustion engine 10 is generally operated in a lean state. In other words, in the internal combustion engine 10, a fuel is combusted in a state where an air/fuel ratio, which is a ratio of air supplied into the combustion chamber to fuel injected into the combustion chamber, is set such that air is excessive, i.e., a lean combustion state.

The supercharger 11 includes a turbine 11a, a rotating shaft 11b and a compressor 11c. The turbine 11a is disposed in an exhaust passage 10ex for the internal combustion engine 10 and rotates by kinetic energy of exhaust gas. The rotating shaft 11b connects an impeller of the turbine 11a to an impeller of the compressor 11c and transmits a rotating force of the turbine 11a to the compressor 11c. The compressor 11c is disposed in an intake passage 10in of the internal combustion engine 10 and supplies intake air to the internal combustion engine 10 after compressing (i.e., supercharging) the intake air.

A cooler (not shown) is disposed in the intake passage 10in downstream of the compressor 11c. The cooler cools intake air (compressed air) compressed by the compressor 11c, and the compressed air cooled by the cooler is distributed into plural combustion chambers of the internal combustion engine 10 after a flow amount of the compressed intake air was adjusted by a throttle valve (not shown). The NOx purifying device 12 is disposed in the exhaust passage 10ex downstream of the turbine 11a, and the DPF 13 (Diesel Particulate Filter) is disposed in the exhaust passage 10ex downstream of the NOx purifying device 12. The DPF 13 filters particulates contained in the exhaust gas.

A supply passage 23 of the reducing agent supplying device is connected to the exhaust passage 10ex upstream of the NOx purifying device 12. A reformed fuel generated by the reducing agent supplying device is supplied as a reducing agent into the exhaust passage 10ex through the supply passage 23. The reformed fuel is generated by partially oxidizing hydrocarbon (i.e., fuel), which is used as a reducing agent, into partially oxidized hydrocarbon, such as aldehyde, as will be described later with reference to FIG. 3.

The NOx purifying device 12 includes a honeycomb carrier housed inside a housing. A coating is provided on a surface of the carrier and a reducing agent is carried by the coating. The NOx purifying device 12 purifies NOx contained in exhaust gas through a reaction of NOx with the reformed fuel in the presence of the reducing catalyst, i.e., a reduction process of NOx into $N_2$. It should be noted that, although $O_2$ (oxygen) is also contained in the exhaust gas in addition to NOx, the reformed reducing agent selectively (preferentially) reacts with NOx in the presence of $O_2$.

In the present embodiment, the reducing catalyst has adsorptivity to adsorb NOx. More specifically, the reducing catalyst exhibits the adsorptivity to adsorb NOx in the exhaust gas when a catalyst temperature is lower than an activation temperature at which reducing reaction by the reducing catalyst can occur. For example, the NOx purifying device 12 may provide NOx adsorption performance with a silver/alumina catalyst that is carried by the carrier. More specifically, a silver as a reducing catalyst is carried by an alumina with which the surface of the carrier is coated. The NOx adsorbed in the reducing catalyst is desorbed from the reducing catalyst when the catalyst temperature is equal to or higher than the activation temperature. Then, the desorbed NOx is reduced by the reformed fuel and thus the NOx is purified.

Next, the reducing agent supplying device will be described below. Generally, the reducing agent supplying device generates the reformed fuel and supplies the reformed fuel into the exhaust passage 10ex through the supply passage 23. The reducing agent supplying device includes a reaction container 20, a heater 21, an injector 22, an ozone generator 30 and air pump 30p, as described below. The reducing agent supplying device further includes the supply passage 23, a common pipe 24, a compressed air pipe 25, an ozone-containing pipe 26, and an electric control device (ECU 40), as described below.

The ozone generator 30 includes a housing 32 having a fluid passage 32a therein and a plurality of pairs of electrodes 31 are arranged inside the fluid passage 32a. The electrodes 31 have a plate shape and are arranged to face each other in parallel. One electrode 31, which is grounded, and an other electrode 31, to which high voltage is applied, are alternately arranged. Power application to the electrodes 31 is controlled by a microcomputer 41 of the ECU 40.

Air blown by the air pump 30p flows into the housing 32 of the ozone generator 30. The air pump 30p is powered by an electric motor, and the electric motor is controlled by the microcomputer 41. The air blown by the air pump 30p flows into the fluid passage 32a within the housing 32, and flows through the discharging passages 31a each formed between the electrodes 31.

The ozone generator 30 is connected to the reaction container 20 through the ozone-containing air pipe 26 and the common pipe 24. That is, an upstream end portion of the ozone-containing air pipe 26 is connected to a downstream portion of the ozone generator 30, and a downstream end portion of the ozone-containing air pipe 26 is connected to an upstream end portion of the common pipe 24. A downstream end portion of the common pipe 24 is connected to an inlet 20in of the reaction container 20. An upstream end portion of the supply passage 23 is connected to an outlet 20out of the reaction container 20. A downstream end portion of the supply passage 23 is connected to the exhaust passage 10ex upstream of the NOx purifying device 12.

An electromagnetic check valve 26v is attached to the ozone-containing air pipe 26. The microcomputer 41 controls the check valve 26v to selectively open or close. Thus, when air pump 30p is on and the check valve 26v is operated to open, air that passed through the discharging passages 31a flows through the ozone-containing air pipe 26, the common pipe 24, the reaction container 20 and the supply passage 23 in this order, and then flows into the exhaust passage 10ex.

An upstream end portion of the compressed air pipe 25 is connected to the intake passage 10in downstream of the compressor 11c, and a downstream end portion of the compressed air pipe 25 is connected to the upstream end portion of the common pipe 24. In short, the upstream end portion of the common pipe 24 branches to be connected to both the compressed air pipe 25 and the ozone-containing air pipe 26. In other words, the compressed air pipe 25 and the ozone-containing air pipe 26 are connected to the common pipe 24 in parallel.

An electromagnetic adjusting valve 25v is attached to the compressed air pipe 25. The microcomputer 41 controls the adjusting valve 25v to selectively open or close the compressed air pipe 25. Therefore, when the adjusting valve 25v is operated to open the compressed air pipe 25, a portion of the compressed air flowing through the intake passage 10in flows through the compressed air pipe 25, the common pipe 24, the reaction container 20 and the supply passage 23 in this order, and then flows into the exhaust passage 10ex. When the adjusting valve 25v is open, the check valve 26v prohibits the compressed air from flowing into the ozone generator 30 and the air pump 30p through the ozone-containing air pipe 26.

The check valve 26v has a valve body that is controlled to switch between a full open position and a full close position. On the other hand, the adjusting valve 25v has a valve body and opening degree of the valve body of the adjusting valve 25v is controlled (i.e., flow rate control) to adjust a flow rate of the compressed air that is to flow into the reaction container 20. To prevent both the check valve 26v and the adjusting valve 25v from opening at the same time, the microcomputer 41 controls one of the check valve 26v and the adjusting valve 25v to open and controls the other of the check valve 26v and the adjusting valve 25v to close.

The heater 21 and the injector 22 are attached to the reaction container 20, and a reaction chamber 20a is formed inside the reaction container 20. The reaction chamber 20a is in fluid communication with the inlet 20in and the outlet 20out. The heater 21 includes a heating portion that generates heat when energinzed, and the energization to the heating portion is controlled by the microcomputer 41. More specifically, the microcomputer 41 controls a heating amount of the heating portion through a duty control of a power supply amount to the heating portion. The heating portion is arranged in the reaction chamber 20a to heat fuel injected from the injector 22 into the reaction chamber 20a. A temperature in the reaction chamber 20a is detected by a chamber temperature sensor 27. The chamber temperature sensor 27 outputs information of the detected temperature (reaction chamber temperature) to the ECU 40.

The injector 22 includes a body with injection holes, an electric actuator and a valve element. When the electric actuator is energized, the valve element moves to open the injection holes, whereby fuel is injected through the injection holes to the reaction chamber 20a. When the electric actuator is de-energized, the valve element moves to close the injection holes, whereby the fuel injection is stopped. The microcomputer 41 controls a fuel injection amount to the reaction chamber 20a per unit time by controlling the energization to the electric actuator. Liquid fuel inside a fuel tank (not shown) is supplied to the injector 22 by a non-illustrated fuel pump. The fuel inside fuel tank is also used as a fuel for combustion as described above. That is, the fuel in the fuel tank is commonly used as fuel for combustion in the internal combustion engine 10 and fuel for the reducing agent.

Liquid fuel injected from the injector 22 into the reaction chamber 20a collides with the heating portion and is heated and vaporized by the heating portion. As a result, the vaporized fuel is partially oxidized with oxygen in the air, and thus the vaporized fuel is reformed into partially oxidized hydrocarbon such as aldehyde. The vaporized fuel as reformed in this way (the reformed fuel) is supplied into the exhaust passage 10ex through the supply passage 23.

When electric power is supplied to the electrodes 31 of the ozone generator 30, electrons emitted from the electrodes 31 collide with oxygen molecules contained in air in the discharging passages 31a. As a result, ozone is generated from the oxygen molecules. That is, the ozone generator 30 brings the oxygen molecules into a plasma state through a discharging process, thereby generating ozone as active oxygen. Thus, when electric power is supplied to the ozone generator 30, air containing the ozone flows through the ozone-containing air pipe 26.

A cool flame reaction occurs inside the reaction chamber 20a. In the cool flam reaction, fuel in gas form is partially oxidized with oxygen in air from the inlet 20in. A partial oxide (for example, aldehyde) may be one example of the fuel partially oxidized in this way in which a portion of the fuel (hydrocarbon compound) is oxidized with an aldehyde group (CHO).

Next, the cool flame reaction will be described in detail with reference to FIGS. 2 to 3.

Figure 2:
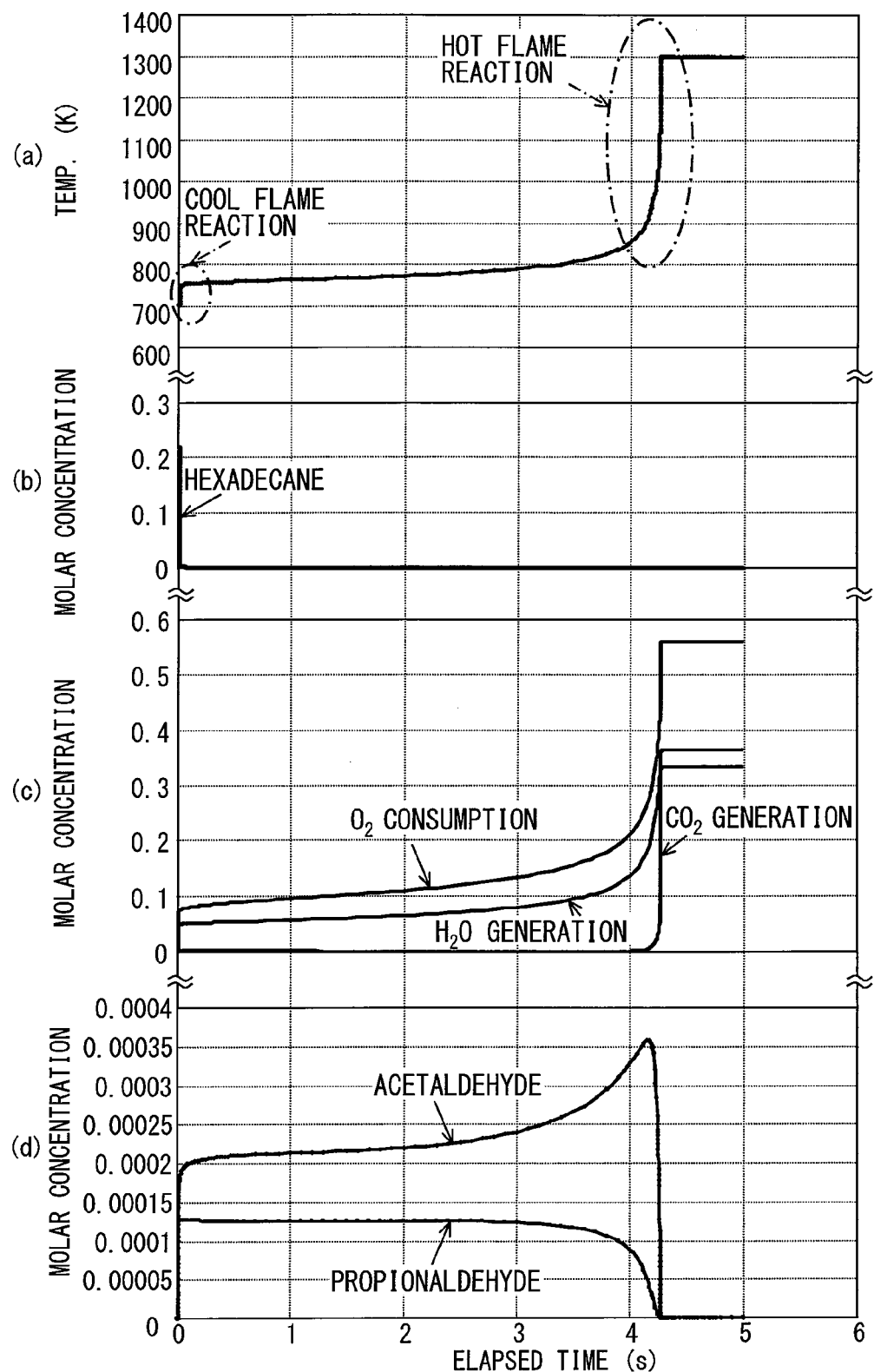
FIG. 2 is graphs related to a two-step oxidation reaction of a cool flame reaction and a hot flame reaction.

FIG. 2 illustrates simulation results showing a phenomenon where fuel (hexadecane) is sprayed onto the heater 21 and is vaporized, and the vaporized fuel staying around the heater 21 is reformed. Specifically, each graph shows, in a case where the vaporized fuel (hexadecane) is exposed to an environment at 430° C., changes of a variety of physical quantities with respect to an elapsed time after the exposure. In FIG. 2, a graph (a) illustrates a change in an ambient temperature, a graph (b) illustrates a change in a molar concentration of the fuel (hexadecane), a graph (c) illustrates changes in a molar concentration of (i) oxygen consumed through the oxidation process, (ii) water molecules generated through the oxidation process and (iii) carbon dioxide molecules generated through the oxidation process, and a graph (d) illustrates changes in a molar concentration of acetaldehyde and propionaldehyde, each of which is a reformed fuel generated through the cool flame reaction. Initial conditions at the start of the fuel injection are set with 1 atmospheric pressure, 2200 ppm of hexadecane concentration, 20% of oxygen concentration, 9% of carbon dioxide concentration and 2% of water concentration.

As shown in FIG. 2, the ambient temperature increases, the molar concentration of the fuel decreases, and the molar concentration of the reformed fuel increased, immediately after injecting the fuel. This means that fuel generates heat by being oxidized with oxygen and that the reformed fuel is generated from the fuel, i.e., the cool flame reaction occurs.

However, such a temperature increase and changes in molar concentration are temporary, and the temperature increase and the changes in the molar concentration do not appear until about 4 seconds elapse from the start of the fuel injection.

When about 4 seconds elapse, the ambient temperature further increases, the molar concentration of the reformed fuel decreases, generation amounts of carbon dioxide and water increase, and a consumption amount of oxygen increases. This means that the reformed fuel generates heat by being oxidized with oxygen and that the reformed fuel completely burns to generate carbon dioxide and water, i.e., the hot flame reaction occurs. A temperature increase amount through the cool flame reaction is less than that through the hot flame reaction. Further, an oxygen consumption amount through the cool flame reaction is less than that through the hot flame reaction.

When the oxidation reaction occurs through two steps, the reformed fuel is generated as a reaction intermediate during a period from the cool flame reaction to the hot flame reaction. Examples of the reaction intermediate may be a variety of hydrocarbon compounds, such as aldehyde, ketone, or the like. FIG. 3 illustrates an example of a main reaction path through which aldehyde is generated.

Figure 3:
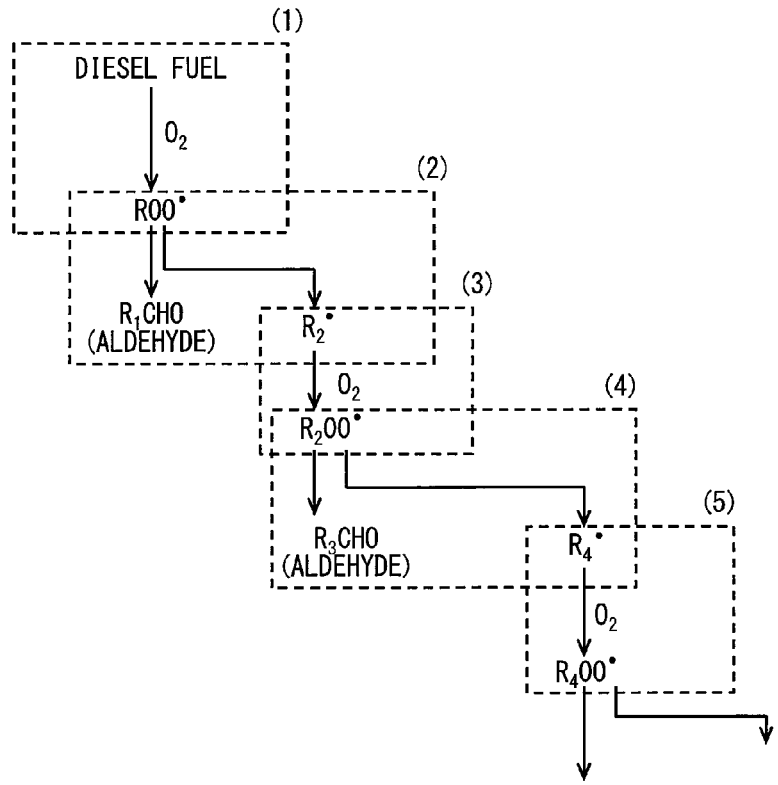
FIG. 3 is a diagram illustrating reaction process of the cool flame reaction.

As indicated by (1) in FIG. 3, hydrocarbon (diesel fuel) reacts with oxygen molecule and hydrocarbon peroxyl radical is generated. The hydrocarbon peroxyl radical is decomposed into aldehyde and hydrocarbon radical (refer to (2) in FIG. 3). The hydrocarbon radical reacts with an oxygen molecule and another hydrocarbon peroxyl radical is generated (refer to (3) in FIG. 3). The hydrocarbon peroxyl radical is decomposed into aldehyde and hydrocarbon radical (refer to (4) in FIG. 3). The hydrocarbon radical reacts with an oxygen molecule and also another hydrocarbon peroxyl radical is generated (refer to (5) in FIG. 3). In this way, hydrocarbon peroxyl radical is repeatedly generated while reducing the carbon number, and aldehyde is generated each time the hydrocarbon peroxyl radical is generated. It should be noted that, in the hot flame reaction, fuel is completely combusted and carbon dioxide and water are generated, and thus the reaction intermediate is not generated. In other words, the reaction intermediate generated through the cool flame reaction is oxidized into carbon dioxide and water during the hot flame reaction.

In the simulation shown in FIG. 2, the exposure temperature is set to 430° C. However, the inventors of the present disclosure had further performed simulation with different the exposure temperatures. As a result, it was found that, when the exposure temperature is 530° C., there was almost no period to stay in the cool flame reaction, and the oxidation reaction was completed with only one step. On the contrary, when the exposure temperature was set to 330° C., a start timing of the cool flame reaction was delayed as compared with a case where the exposure temperature was set to 430° C. Also, when the exposure temperature was set to 230° C. or lower, none of the cool flame reaction and the hot flame reaction occurred, i.e., the oxidation reaction did not occur.

In the simulation illustrated in FIG. 2, the equivalent ratio, which is a ratio of injected fuel and supplied air, is set to 0.23. In this connection, the present inventors have obtained results of the simulation with the different equivalent ratios. It should be noted that the equivalent ratio may be defined as a value by dividing "weight of fuel contained in an air-fuel mixture" by "weight of fuel that can be completely burned". When the equivalent ratio is set to 1.0, there is almost no period to stay in the cool flame reaction, and the oxidation reaction is completed with only one step. Also, when the equivalent ratio is set to 0.37, the start timing of the cool flame reaction is advanced, a cool flame reaction rate increases, a cool flame reaction period decreases, and the ambient temperature at the time of completing the cool flame reaction increases, as compared with a case in which the equivalent ratio is set to 0.23.

Figure 4:
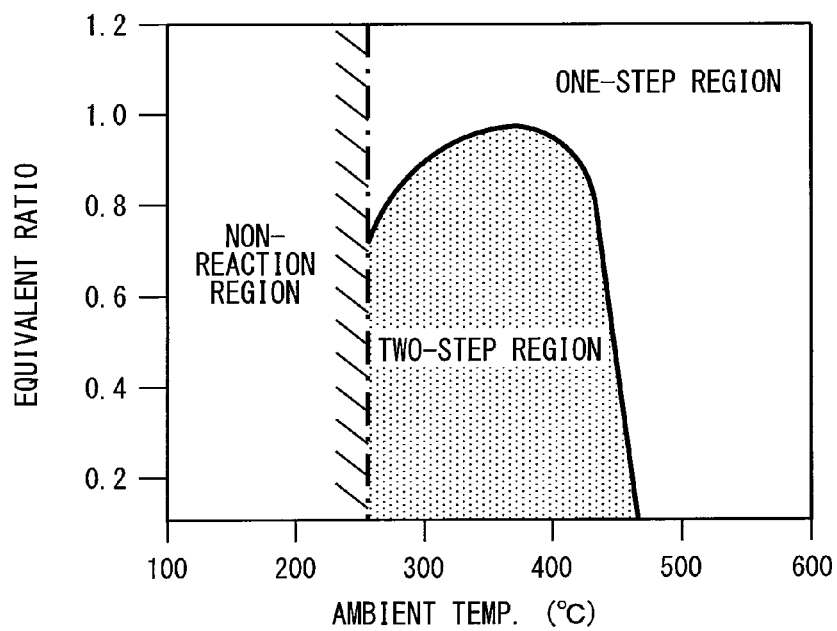
FIG. 4 is a diagram illustrating a region defined by an ambient temperature and an equivalent ratio where two-step oxidation reaction occurs.

FIG. 4 illustrates a summary of the analysis results as described above. FIG. 4 indicates a relationship between the exposure temperature (the ambient temperature), the equivalent ratio, and occurrence/non-occurrence of the cool frame reaction. In FIG. 4, the abscissa of the graph indicates the exposure temperature (the ambient temperature) and the ordinate of the graph indicates the equivalent ratio. The doted region in FIG. 4 is a region in which a two-step oxidation reaction occurs. As shown in FIG. 4, a region in which the ambient temperature is lower than a lower limit value is a non-reaction region in which the oxidation reaction does not occur. Further, even when the ambient temperature is higher than the lower limit value, a region in which the equivalent ratio is equal to or greater than 1.0 is a one-step oxidation reaction region in which the oxidation is completed with only one step.

A boundary line between the two-step oxidation reaction region and the one-step oxidation reaction region varies according to the ambient temperature and the equivalent ratio. That is, when the ambient temperature falls within a specified temperature range and the equivalent ratio falls within a specified equivalent ratio range, the two-step oxidation reaction occurs. That is, the specified temperature range and the specified equivalent ratio range correspond to the doted region in FIG. 4. When the ambient temperature is set to an optimum temperature (e.g., 370° C.) within the specified temperature range, the equivalent ratio on the boundary line has a maximum value (e.g., 1.0). Thus, in order to generate the cool flame reaction earlier, the heater temperature is adjusted to the optimum temperature and the equivalent ratio is set to 1.0. However, when the equivalent ratio is greater than 1.0, the cool flame reaction does not occur. Thus, the equivalent ratio is preferably set to a value less than 1.0 by a given margin.

In the simulation as shown in FIG. 2, an ozone concentration in air is set to zero. The inventors of the present disclosure had further performed simulation with different ozone concentrations in air. In the simulation, an initial condition was set with 1 atmospheric pressure, a hexadecane concentration of 2200 ppm, and the ambient temperature of 330° C. As a result, it was found that the start timing of the cool flame reaction became earlier as the ozone concentration increased. Such a phenomenon can be explained as below. As described above, hydrocarbon radical reacts with oxygen molecule in (1), (3) and (5) in FIG. 3, and these reaction are accelerated with ozone contained in air. As a result, aldehyde is generated in a short time.

The microcomputer 41 of the ECU 40 includes a memory unit to store programs, and a central processing unit executing an arithmetic processing according to the programs stored in the memory unit. The ECU 40 controls the operation of the internal combustion engine 10 based on detection values such as a depressing amount of an accelerator pedal (i.e., engine load), a rotational speed of the internal combustion engine 10 (i.e., an engine rotational speed), an intake air pressure, an exhaust pressure or the like.

The ECU 40 generally controls an amount and injection timing of fuel for combustion that is injected from a fuel injection valve (not shown) according to the engine rotational speed and engine load. Further, the ECU 40 controls the operation of the reducing agent supplying device based on the physical quantities detected by the chamber temperature sensor 27, the catalyst temperature sensor 42 and the exhaust pressure sensor 43.

Figure 5:
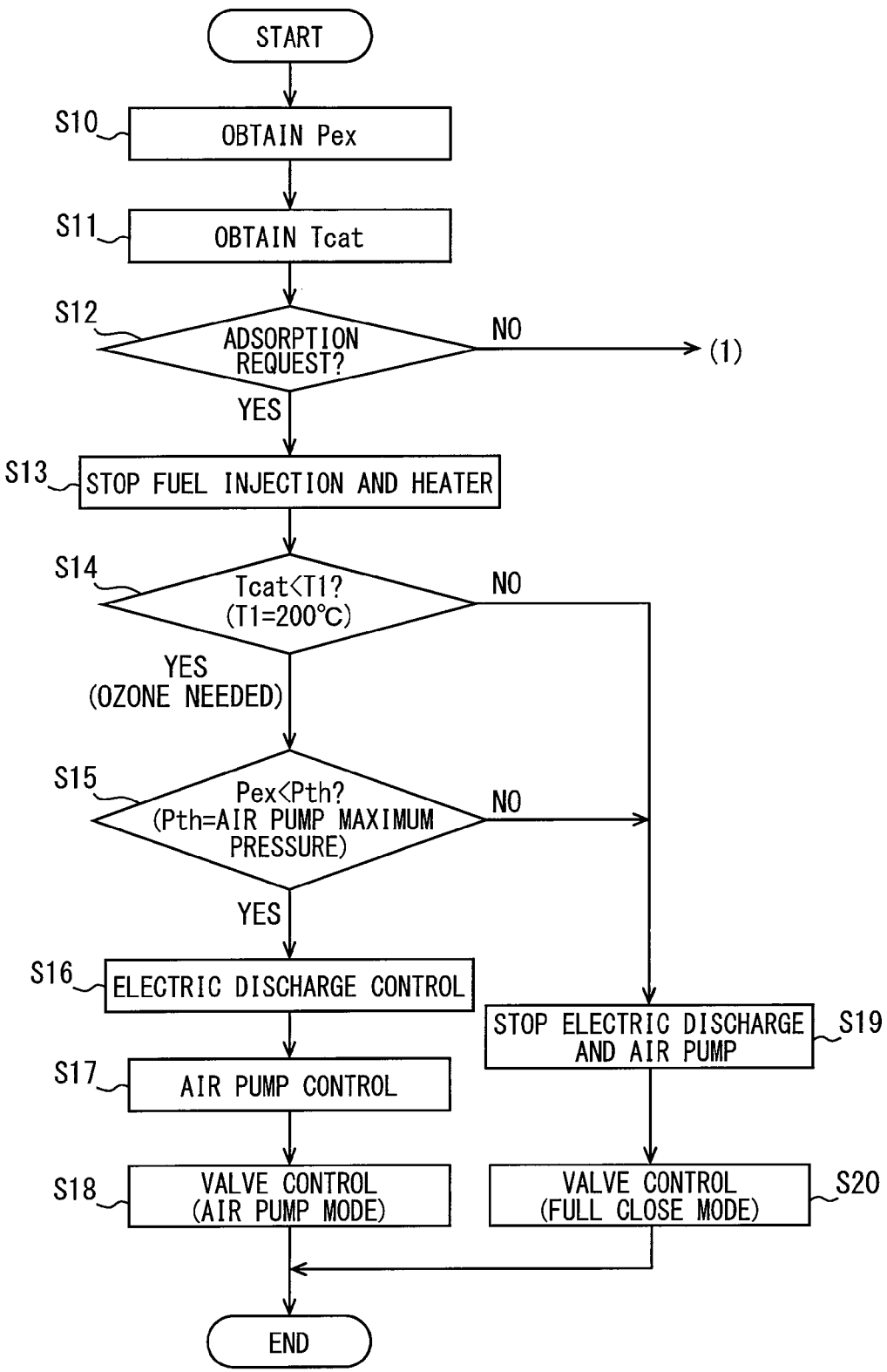
FIG. 5 is a flowchart of process by the reducing agent supplying device shown in FIG. 1.
Figure 6:
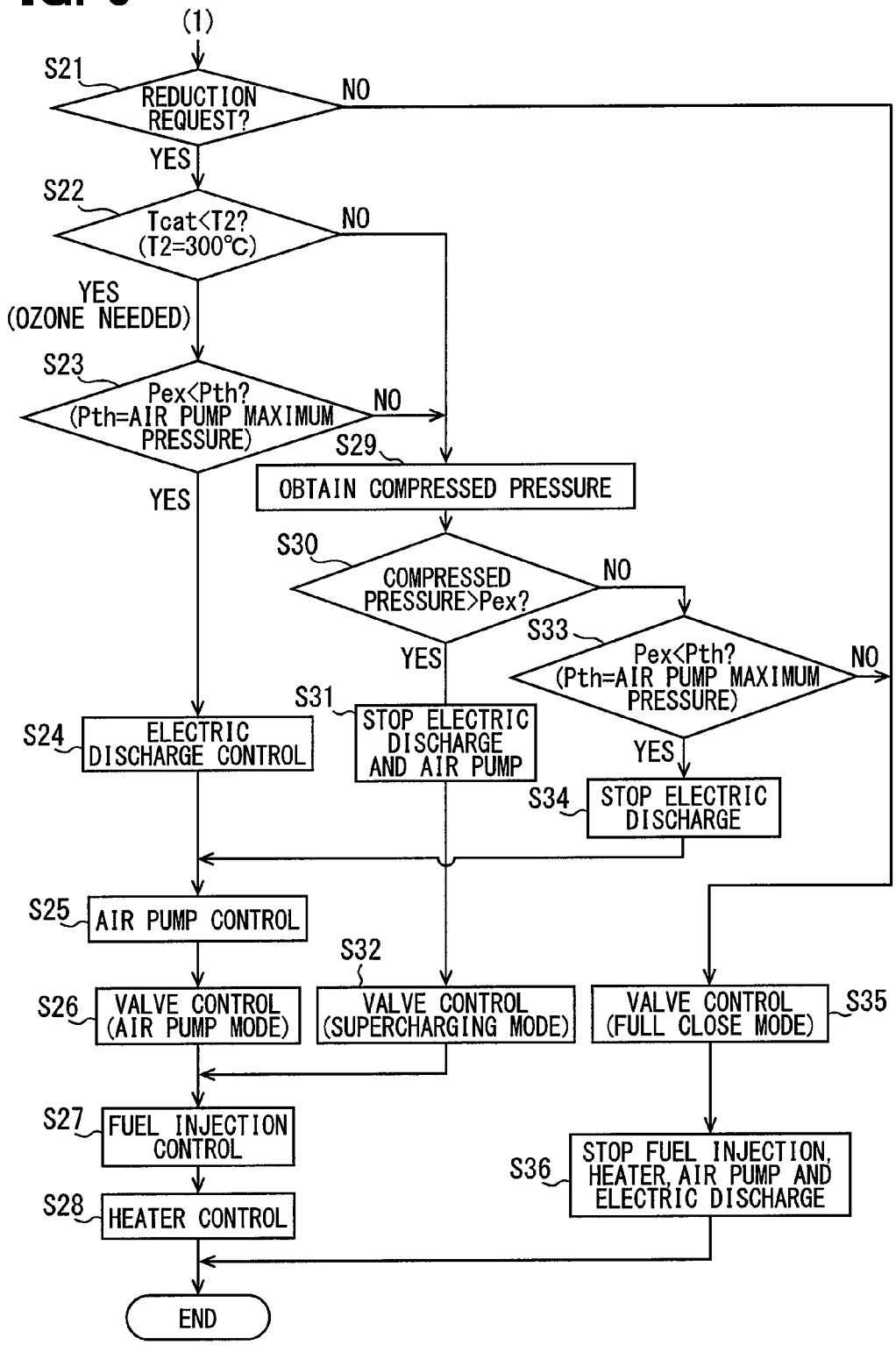
FIG. 6 is a subsequence process of the flowchart shown in FIG. 5.

In other words, the microcomputer 41 switches, based on the chamber temperature, between the generation of the reformed fuel and the generation of the ozone by repeatedly executing processes (i.e., programs) as shown in FIGS. 5 and 6 at a predetermined period. The above process is constantly executed while the internal combustion engine 10 is running. Furthermore, the microcomputer 41 executing the above program also switches, based on the catalyst temperature and the exhaust gas temperature, between an air pump mode and a supercharging mode.

The air pump mode is a mode where air blown by the air pump 30$p$ is supplied into the reaction chamber 20$a$ through the ozone-containing air pipe 26. The air pump mode includes a mode where the ozone-containing air that contains the ozone generated by the ozone generator 30 is supplied by the air pump 30$p$ and a mode where the ozone generator 30 is stopped and air without ozone is supplied by the air pump 30$p$. The supercharging mode is a mode where a portion of intake air (i.e., compressed air) compressed by the compressor 11$c$ is supplied into the reaction chamber 20$a$ through the compressed air pipe 25.

The adjusting valve 25$v$ and the check valve 26$v$ may provide "switching device" that switches between the air pump mode and the supercharging mode. The microcomputer 41 controlling the adjusting valve 25$v$ and the check valve 26$v$ may provide a switching controller 41$a$ (refer to FIG. 1) that controls the switching device. The catalyst temperature sensor 42 is attached to the NOx purifying device 12 to detect an ambient temperature (catalyst temperature) of the reducing catalyst. The exhaust pressure sensor 43 is attached to the exhaust passage 10$ex$ to detect a pressure of the exhaust gas (exhaust pressure) at a connecting position of the exhaust passage 10$ex$ with the supply passage 23.

Initially, a pressure inside the exhaust passage 10$ex$ (exhaust pressure Pex) detected by the exhaust pressure sensor 43 is obtained at Step 10 in FIG. 5. Next, at Step 11, a temperature of the reducing catalyst (catalyst temperature Tcat) detected by the catalyst temperature sensor 42 is obtained. At Step 12, the microcomputer 41 determines whether an adsorption request exists. Specifically, the microcomputer 41 determines that the adsorption request exists when the obtained catalyst temperature Tcat is lower than the activation temperature (e.g., 200° C.) of the reducing catalyst. However, when the microcomputer 41 estimates that a NOx adsorbed amount in the reducing catalyst reaches a saturation amount, the microcomputer 41 determines that the adsorption request does not exist even when the catalyst temperature Tcat is lower than the activation temperature. The NOx adsorption amount is estimated based the history of the change of operating conditions of the internal combustion engine 10 and the catalyst temperature for each operating condition.

When the microcomputer 41 determines that the adsorption request exists at Step 12, energization to the injector 22 and the heater 21 is stopped at Step 13. Thus, the fuel injection to the reaction chamber 20$a$ by the injector 22 and heating in the reaction chamber 20$a$ by the heater 21 are stopped.

Next, at Step 14, the microcomputer 41 determines whether a request for supplying ozone (ozone request) into the exhaust passage 10$ex$ through the supply passage 23 exists when adsorbing NOx in the reducing catalyst. More specifically, the microcomputer 41 determines whether the obtained catalyst temperature Tcat is lower than a first temperature T1. The first temperature T1 is set to be lower than a temperature (e.g., 200° C.) at which oxidative activation of the reducing catalyst starts (i.e., the activation temperature). When the catalyst temperature Tcat is lower than the first temperature T1, the microcomputer 41 determines that the ozone request exists.

In other words, since NO is oxidized into $NO_2$ due to the oxidative activation of the reducing catalyst when the catalyst temperature Tcat is equal to or higher than the first temperature T1, NOx (i.e., $NO_2$) may be sufficiently adsorbed in the reducing catalyst even without ozone. On the contrary, when the catalyst temperature Tcat is lower than the first temperature, ozone supply is requested to oxidize NO in the exhaust gas into $NO_2$ for the sufficient adsorption of NOx.

When the microcomputer 41 determines that the ozone request exists at Step 14, the microcomputer 41 determines whether an air discharge pressure of the air pump 30$p$ (air pump discharge pressure) is substantially higher than the exhaust pressure Pex, in other words, supply of the ozone-containing air into the exhaust passage 10$ex$ is possible, at Step 15. Specifically, the microcomputer 41 determines whether the exhaust pressure Pex obtained at Step 10 is less than a specified threshold value Pth. The threshold value Pth is set to be equal to or slightly lower than a maximum discharge pressure of the air pump 30$p$.

When the microcomputer 41 determines that the exhaust pressure Pex is lower than the threshold value Pth at Step 15, i.e., ozone supply by the air pump 30$p$ with the air pump discharge pressure is possible, the microcomputer 41 executes electric discharge control to generate ozone at Step 16. Specifically, a predetermined power amount is applied to the electrodes 31 of the ozone generator 30 to generate electric discharge. At Step 17, the microcomputer 41 executes air pump control to blow air into the ozone generator 30. Specifically, the air pump 30$p$ is operated with a predetermined power amount. At Step 18, the microcomputer 41 controls (i.e., execute valve control) the adjusting valve 25$v$ and the check valve 26$v$ under the air pump mode. Specifically, the adjusting valve 25$v$ is operated to close, whereas the check valve 26$v$ is operated to open.

According to the air pump mode by Steps 16 to 18, the ozone generator 30 generates ozone. Then, the ozone-containing air that contains the generated ozone flows through the ozone-containing air pipe 26, the common pipe 24, the reaction container 20 and the supply passage 23 in this order, and then flows into the exhaust passage 10$ex$. Thus, the oxidation process of NO into the $NO_2$ is accelerated by the ozone, whereby the NOx adsorption amount in the reducing catalyst can be increased.

If the energization to the heater 21 continues, the ozone would be heated and thermally decompose. Further, if fuel injection from the injector 22 continues, the ozone would be reacted with the fuel. In view of these, when the microcomputer 41 determines that the ozone request exists at Step 14 and the ozone mode is executed, the heater 21 and the fuel injection are stopped at Step 13, whereby the reaction of the ozone with fuel does not occur and thermal decomposition of ozone can be avoided. Therefore, the generated ozone can be supplied into the exhaust passage 10$ex$ without reaction with fuel or thermal decomposition.

On the other hand, when the microcomputer 41 determines that the exhaust pressure Pex is equal to or higher than the threshold value Pth at Step 15, i.e., ozone supply by the air pump 30$p$ is not possible, or determines that the ozone request does not exist at Step 14, the process proceeds to Step 19. At Step 19, energization to the ozone generator 30 and the air pump 30p is stopped. At Step 20, the adjusting valve 25v and the check valve 26v are controlled (i.e., the valve control is executed) under the full close mode. That is, both the adjusting valve 25v and the check valve 26v are operated to close.

According to the full close mode by Steps 19 and 20, the ozone generator 30 stops generating ozone and air supply by the air pump 30p is also stopped. Furthermore, supply of the compressed air through the compressed air pipe 25 is stopped. That is, none of ozone, air, and fuel are not supplied into the exhaust passage 10ex through the supply passage 23.

When the microcomputer 41 determines that the catalyst temperature Tcat is equal to or higher than the first temperature T1 at Step 14, and the full close mode is executed at Steps 19 and 20, unnecessary ozone supply can be avoided. Furthermore, electric consumption can be reduced by stopping the ozone generator 30 and the air pump 30p.

When the microcomputer 41 determines that the exhaust pressure Pex is equal to or higher than the threshold value Pth at Step 15 and the full close mode is executed at Steps 19 and 20, a backflow of the exhaust gas in the exhaust passage 10ex toward the ozone-containing air pipe 26 can be prohibited. Hence, pollution of the ozone generator 30 and the air pump 30p with the exhaust gas can be avoided.

Next, the process when the microcomputer 41 determines that the adsorption request does not exist at Step 12 will be described with reference to FIG. 6.

Initially, the microcomputer 41 determines whether a reduction request exists at Step 21 in FIG. 6. Specifically, when the catalyst temperature Tcat obtained at Step 11 is equal to or higher than the activation temperature of the reducing catalyst and lower than an upper limit, the microcomputer 41 determines that the reduction request exists. This is because if the catalyst temperature Tcat is equal to or higher than the activation temperature and the upper limit, reducing reaction hardly occurs even when supplying the reducing agent.

When the microcomputer 41 determines that the reduction request exists at Step 21, the microcomputer 41 determines, at Step 22, whether a request for supplying ozone (ozone request) into the reaction chamber 20a during the reduction of NOx with the reducing agent. Specifically, the microcomputer 41 determines whether the catalyst temperature Tcat is lower than a second specified temperature T2. The second temperature T2 is set to a temperature (e.g., 300° C.) higher than the activation temperature. When the catalyst temperature Tcat is lower than the second temperature T2, the microcomputer 41 determines that the ozone request exists.

In short, when the catalyst temperature Tcat is lower than the second temperature T2, a reaction rate in the reaction chamber 20a shown in FIG. 3 is increased by supplying ozone, and thus the reformation of fuel is accelerated. However, if the catalyst temperature Tcat is equal to or higher than the second temperature T2, the reaction rate is sufficiently obtained even without supplying ozone, and thus the accelerating effect by supplying ozone may be minimized under the condition. In view of this, the microcomputer 41 determines that the ozone request exists when the catalyst temperature Tcat is lower than the second temperature T2 at Step 22, thereby unnecessary ozone supply can be avoided when the catalyst temperature Tcat is above the second temperature T2. Therefore, the electric consumption at the ozone generator 30 may be suppressed.

When the microcomputer 41 determines that the ozone request exists at Step 22, the microcomputer 41 determines, at Step 23, whether the air discharge pressure (air pump discharge pressure) of the air pump 30p is substantially higher than the exhaust pressure Pex, i.e., supply of the reformed reducing agent into the exhaust passage 10ex by the air pump 30p is possible. Specifically, as with Step 15, the microcomputer 41 determines whether the exhaust pressure Pex is lower than the threshold value Pth.

When the microcomputer 41 determines that the exhaust pressure Pex is lower than the threshold value Pth at Step 23, i.e., the supply of the reformed reducing agent with the air pump discharge pressure is possible, the microcomputer 41 executes the discharge control to generate ozone at Step 24. Specifically, a power supply amount to the electrodes 31 are adjusted such that an ozone generation amount becomes an amount according to a fuel injection amount set at Step 27, which will be described later.

At Step 25, the microcomputer 41 executes air pump control to blow air into the ozone generator 30. Specifically, an air supply amount is adjusted by controlling energization to the air pump 30p such that the equivalent ratio of fuel injected at Step 27 and the supplied air becomes a target equivalent ratio $\phi$trg described below. At Step 26, the microcomputer 41 controls (i.e., executes the valve control) the adjusting valve 25v and the check valve 26v under the air pump mode. Specifically, the adjusting valve 25v is operated to close and the check valve 26v is operated to open.

At Step 27, the microcomputer 41 sets a reducing agent supply amount as a target fuel flow rate Ftrg. The target fuel flow rate Ftrg corresponds to an amount of the reducing agent, which is supplied into to the NOx purifying device 12, with which NOx flowing into the NOx purifying device 12 is completely reduced without excess of the reducing agent. The target fuel flow rate Ftrg is the mass of fuel that is supplied into the NOx purifying device 12 per unit time.

Specifically, the target fuel flow rate Ftrg is set based on an NOx inflow rate, which will be described below, and the catalyst temperature Tcat. The NOx inflow rate is the mass of NOx that flows into the NOx purifying device 12 per unit time. For example, the NOx inflow rate can be estimated based on an operating condition of the internal combustion engine 10. The target fuel flow rate Ftrg is increased as the NOx inflow rate increases. Also, since a reduced amount (reducing performance) of NOx with the reducing catalyst varies according to the NOx catalyst temperature, the target fuel flow rate Ftrg is set according to a difference in the reducing performance due to the NOx catalyst temperature. The microcomputer 41 controls the operation of the injector 22 to execute fuel injection based on the target fuel flow rate Ftrg. Specifically, opening time of the injector 22 is controlled to increase as the target fuel flow rate increases. Alternatively, the interval between the termination of fuel injection this time and the start of fuel injection next time is shortened.

Moreover, at Step 27, the microcomputer 41 sets the target equivalent ratio $\phi$trg to be used for the air pump control at Step 25 based on the chamber temperature detected by the chamber temperature sensor 27 and the target fuel flow rate Ftrg such that the cool flame reaction occurs. Specifically, a maximum value of the equivalent ratio, which is within the two-step oxidation reaction and corresponds to the ambient temperature (i.e., the chamber temperature), or a value calculated by subtracting a given margin from the maximum value of the equivalent ratio is stored as a map of the target equivalent ratio $\phi$trg in the microcomputer 41. The target equivalent ratio $\phi$trg corresponding to the detected chamber temperature is calculated using the map. If the target equivalent ratio $\phi$trg is set with the given margin, as described above, it is possible to avoid a situation where an actual equivalent ratio is greater than the maximum value of the equivalent ratio even if the actual equivalent ratio is greater than the calculated equivalent ratio φtrg, whereby the likelihood of occurrence of the hot flame reaction beyond the cool flame reaction can be decreased.

At Step 28, the microcomputer 41 executes a feedback control to the heater 21 such that the obtained chamber temperature becomes a value equal to a predetermined target temperature Ttrg. For example, the microcomputer 41 executes a duty-control to a power supply amount to the heater 21 according to a deviation between the detection value of the chamber temperature sensor 27 and the target temperature Ttrg. Alternatively, the microcomputer 41 may execute an on/off control to the heater 21 where power supply to the heater 21 is stopped when the chamber temperature exceeds the target temperature Ttrg by a given value. The target temperature Ttrg is set to an ambient temperature within the two-step oxidation reaction region shown in FIG. 4 at which the equivalent ratio has the maximum value (for example, 370° C.).

According to the air pump mode at Steps 24 to 28, ozone is generated in the ozone generator 30. The ozone-containing air including the generated ozone is supplied into the reaction container 20 through the ozone-containing air pipe 26 and the common pipe 24. Thus, the fuel reformation in the reaction container 20 is accelerated by the ozone, whereby the NOx purification rate with the reducing catalyst can be improved.

As described above, the chamber temperature and the equivalent ratio are adjusted within the two-step oxidation reaction region by controlling the air pump 30p and the heater 21 according to the target fuel flow rate Ftrg. Thus, the cool flame reaction occurs and the reformed fuel is generated. The lower limit of a temperature region within which the reaction temperature is adjusted is 260 C.° at which a boundary line between the one or two-step oxidation reaction region and the non-reaction region exists. The upper limit of the temperature region is set to a maximum temperature on a boundary line between the one-step oxidation region and the two-step oxidation region. On the other hand, the upper limit of the equivalent ratio range, within which the equivalent ratio is adjusted, is set to a maximum value on a boundary line between the one-step oxidation reaction region and the two-step oxidation region, which corresponds to the ambient temperature of 370° C.

When the microcomputer 41 determines that the exhaust pressure Pex is equal to or higher than the threshold value Pth at Step 23, i.e., supply of the reformed reducing agent with the air pump discharge pressure is not possible, or that the ozone request does not exist at Step 22, the process at Step 29 is executed. At Step 29, a pressure of the compressed air (compressed pressure) that is compressed by the compressor 11c is obtained. For example, the compressed pressure is estimated based on operating conditions such as the engine rotational speed or engine load. At Step 30, the microcomputer 41 determines whether the obtained compressed pressure is higher than the exhaust pressure Pex obtained at Step 10.

When the microcomputer 41 determines that the compressed pressure is higher than the exhaust pressure Pex, power supply to the ozone generator 30 and the air pump 30p is stopped at Step 31. Next, at Step 32, the microcomputer 41 controls the adjusting valve 25v and the check valve 26v under the supercharging mode (i.e., executes the valve control). Specifically, the adjusting valve 25v is operated to open, whereas the check valve 26v is operated to close. Next, the fuel injection control as described at Step 27 and the heater control as described at Step 28 are executed.

According to the supercharging mode at Steps 32, 27, and 28, the compressed air by the compressor 11c is supplied into the reaction chamber 20a through the compressed air pipe 25 and the common pipe 24. In short, oxygen required for partial oxidation of the fuel is supplied into the reaction chamber 20a. Then, the reformed fuel is supplied into the exhaust passage 10ex by the pressure of the compressed air even under the exhaust pressure Pex that is higher than the threshold value Pth. In this way, the reformed fuel flows into the NOx purifying device 12, whereby the NOx purification rate with the reducing catalyst can be more improved, compared to a case where fuel without being reformed is supplied.

On the other hand, when the microcomputer 41 determines that the compressed pressure is equal to or lower than the exhaust pressure Pex at Step 30, i.e., supply of the reformed fuel into the exhaust passage 10ex with the compressed pressure is not possible, the microcomputer 41 executes, at Step 33, a determination similar to Step 15. That is, the microcomputer 41 determines whether the air pump discharge pressure is substantially higher than the exhaust pressure Pex, in other words, supply of the ozone-containing air into the exhaust passage 10ex is possible by the air pump 30p. When the microcomputer 41 determines that the exhaust pressure Pex is lower than the threshold value Pth, i.e., the supply of the ozone-containing air into the exhaust passage 10ex is possible, power supply to the ozone generator 30 is stopped at Step 34. Thereafter, the microcomputer 41 executes the air pump control of Step 25, the valve control under the air pump mode of Step 26, the fuel injection control of Step 27 and the heater control of Step 28, as described above.

The situation where the exhaust pressure Pex is equal to or higher than the compressed pressure (S30: NO) and lower than the threshold value Pth may occur under such a circumference as described below. There is a time lag after the exhaust pressure Pex is increased until the compressed pressure is increased due to the increase of the exhaust pressure Pex. Hence, the above-described situation may occur when the exhaust pressure Pex rises from a low pressure state.

According to the air pump mode at Steps 25-28, air without ozone is supplied into the reaction container 20 through the ozone-containing air pipe 26 and the common pipe 24. In short, ozone required for partial oxidation of fuel is supplied into the reaction chamber 20a. Thus, the reformed fuel may be supplied into the exhaust passage 10ex by a blowing pressure of the air pump 30p even with the compressed pressure that is below the exhaust pressure Pex. In this way, the reformed fuel flows into the NOx purifying device 12, and thus the NOx purification rate with the reducing catalyst can be improved compared to the case where fuel without being reformed is used.

On the other hand, when the microcomputer 41 determines that the exhaust pressure Pex is equal to or higher than the threshold value Pex at Step 33, in other words, supply of the reformed fuel by the compressed air or by the blowing pressure of the air pump 30p is not possible, the operation of the NOx purifying device 12 is stopped. Specifically, at Step 35, the microcomputer 41 controls, as with Step 20, the adjusting valve 25v and the check valve 26v under the full close mode (i.e., executes the valve control). At Step 36, power supply to the ozone generator 30, the air pump 30p, the heater 21 and the injector 22 is stopped.

In short, even if the microcomputer 41 determines that the reduction request exists (S21: YES), the microcomputer 41 stops the operation of the NOx purifying device 12 under the full close mode when both the blowing pressure of the air pump 30p and the compressed pressure are lower than the exhaust pressure Pex (S33: NO). Also, when the microcomputer 41 determines that the adsorption request and the reduction request do not exist (S12: NO, S21: NO), the microcomputer 41 stops the operation of the NOx purifying device 12 under the full close mode. For example, when the NOx catalyst temperature is lower than the activation temperature and the NOx adsorbed amount reaches a saturation amount, or when the NOx catalyst temperature reaches a high temperature beyond a reducible range, both the adsorption request and the reduction request do not exist.

Furthermore, when the catalyst temperature Tcat is lower than the activation temperature and the NOx adsorbed amount reaches the saturation amount, or when the catalyst temperature Tcat reaches a high temperature beyond the reducible range, the NOx purifying device 12 is controlled to stop under the full close mode.

As described above, the reducing agent supplying device according to the present embodiment generally includes the reaction container 20, the ozone generator 30, the air pump 30p, the ozone-containing air pipe 26, the compressed air pipe 25, the switching device including the adjusting valve 25v and the check valve 26v, and the switching controller 41a. That is, the ozone-containing air pipe 26 through which the ozone-containing air flows into the reaction chamber 20a and the compressed air pipe 25 through which the compressed air flows into the reaction chamber 20a are separately provided. Then, the air pump 30p and the ozone generator 30 are disposed in the ozone-containing air pipe 26 to be separated from the compressed air pipe 25.

Accordingly, it is possible to suppress an impeller or an impeller casing for the air pump 30p, and the electrodes 31 of the ozone generator 30 to be polluted with dust in intake air. Specific examples of the dust may include components of lubricating oil contained in intake air of the internal combustion engine 10, non-combusted fuel compositions, or the like. Especially, in the present embodiment, the check valve 26v is disposed in the ozone-containing air pipe 26 downstream of the ozone generator 30 and the air pump 30p. The check valve 26v may serve an inflow prevention portion that prevents the compressed air from flowing into the ozone generator 30 and the air pump 30p. Thus, the pollution of the ozone generator 30 and the air pump 30p with the intake air may be likely avoided.

In addition, since the switching device and the switching controller are provided in the present embodiment, when supply of the reformed fuel by the air pump 30p is difficult due to the high exhaust pressure Pex (S23: NO), the microcomputer 41 switches the operation of the reducing agent supplying device to the supercharging mode (S32), whereby the reducing agent reformed in the reaction chamber 20a can be supplied into the exhaust passage 10ex. Further, when the exhaust pressure Pex is low so that the supply of the reformed fuel by the air pump 30p is possible (S23: YES), and when the reducing catalyst temperature is a temperature at which an improvement in the NOx purification rate is expected (S22: YES), the microcomputer 41 switches the operation of the reducing agent supplying device to the air pump mode (S26), whereby the reducing agent reformed with the ozone-containing air can be supplied into the exhaust passage 10ex.

As described above, according to the reducing agent supplying device of the present embodiment, the NOx purification rate is improved by supplying ozone. Furthermore, the supply of the reformed reducing agent is possible even when the exhaust pressure Pex is high, while suppressing the pollution of the air pump 30p and the ozone generator 30.

In a reducing agent supplying device as a comparative example, intake air compressed by a supercharger is supplied with assistance by an air pump. In short, the comparative example does not include the ozone-containing air pipe 26 as described in the present embodiment, and the air pump of the comparative example is disposed in a pipe corresponding to the compressed air pipe 25 of the present embodiment. Thus, in the comparative example, the compressed air may become low when the internal combustion engine is in a low load operation, whereby there is concern that high load may be applied to the air pump. In the present embodiment, however, since the ozone-containing air pipe 26 and the compressed air pipe 25 are separately provided, the above-described concern may not be generated.

Furthermore, the adjusting valve 25v is disposed in the compressed air pipe 25 and the adjusting valve 25v is operated to close during the air pump mode, a backflow of the blowing air of the air pump 30p or the exhaust gas toward the compressed air pipe 25 can be prevented.

The reducing agent supplying device according to the present embodiment also includes a reducibility determiner, a first ozone-request determiner, and a first air-pump-effectiveness determiner. The microcomputer 41 executing Step 21 may provide the reducibility determiner that determines, based on the catalyst temperature Tcat, whether a reducible state exists where a reduction of the NOx is possible with the reducing catalyst. The microcomputer 41 executing Step 22 may provide the first ozone-request determiner that determines, based on the catalyst temperature Tcat, whether a first ozone-requested state exists where supply of the ozone-containing air to the reaction chamber 20a is requested during the reducible state. The microcomputer 41 executing Step 23 may provide the first air-pump-effectiveness determiner that determines, based on the exhaust pressure Pex, whether a first low exhaust pressure state exists where supply of the reducing agent into the exhaust passage 10ex by the air pump 30p is possible. The switching controller 41a switches the operation of the reducing agent supplying device to the air pump mode when the reducibility determiner determines that the reducibility exists (S21: YES), the first ozone-request determiner determines that the first ozone-requested state exists (S22: YES) and the first air-pump-effectiveness determiner determines that the first low exhaust pressure exists (S23: YES).

Accordingly, when the exhaust pressure Pex is low so that the supply of the reformed fuel by the air pump 30p is possible, the switching controller switches the operation of the reducing agent supplying device to the air pump mode, whereby the ozone-containing air can be supplied into the reaction chamber 20a. Thus, it is possible to accelerate activation of the reformed reducing agent, thereby improving the NOx purification rate.

Furthermore, the switching controller 41a according to the present embodiment switches to the supercharging mode when the reducibility determiner determines that the reducible state exists (S21: YES), the first ozone-request determiner determines that the first ozone-requested state exists (S22: YES), and the first air-pump-effectiveness determiner determines that the first low exhaust pressure state does not exist (S23: NO).

Hence, even if the exhaust pressure Pex is high so that the supply of the reformed reducing agent by the air pump 30p is not possible, the reformed reducing agent can be supplied into the exhaust passage 10ex by switching to the supercharging mode, although advantage by supplying ozone cannot be obtained. Therefore, it is possible to avoid a situation where the reformed reducing agent cannot be supplied into the exhaust passage 10ex.

In the present embodiment, the switching controller 41a switches to the supercharging mode when the reducibility determiner determines that the reducible state exists (S21: YES) and the first ozone-request determiner determines that the first ozone-requested state does not exist (S22: NO).

Accordingly, even if the exhaust pressure Pex is high so that the supply of the reformed reducing agent into the exhaust passage 10ex is not possible by the air pump 30p, the reformed reducing agent can be supplied into the exhaust passage 10ex by switching to the supercharging mode. Thus, it is possible to avoid a situation where the reformed reducing agent cannot be supplied into the exhaust passage 10ex. It should be noted that when the exhaust pressure Pex is high, a temperature of the exhaust gas is also high because of high load operation of the internal combustion engine 10. As a result, the catalyst temperature Tcat likely increases to some extent where the first ozone-requested state does not exist.

In the supercharging mode, since power supply to the air pump 30p and the ozone generator 30 is stopped, the electric consumption at the air pump 30p and the ozone generator 30 can be reduced.

Furthermore, the reducing agent supplying device according to the present embodiment includes an adsorbability determiner, a second ozone-request determiner, and a second air-pump-effectiveness determiner. The microcomputer 41 executing Step 12 may provide the adsorbability determiner that determines, based on the catalyst temperature Tcat, whether an adsorbable state exists where adsorption of the NOx in the reducing catalyst is possible. The microcomputer 41 executing Step 14 may provide the second ozone-request determiner that determines, based on the catalyst temperature Tcat, whether a second ozone-requested state exists where the supply of the ozone-containing air into the exhaust passage 10ex is requested during the adsorbable state. The microcomputer 41 executing Step 15 may provide the second air-pump-effectiveness determiner that determines, based on the exhaust pressure Pex, whether a second low exhaust pressure state exists where the supply of the ozone-containing air into the exhaust passage 10ex by the air pump 30p is possible. The switching controller 41a switches to the air pump mode when the adsorbability determiner determines that the adsorbable state exists (S12: YES), the second ozone-request determiner determines that the second ozone-requested state exists (S14: YES), and the second air-pump-effectiveness determiner determines that the second low exhaust pressure state exists (S15: YES).

Accordingly, when the exhaust pressure Pex is low so that supply of the reformed reducing agent by the air pump 30p is possible, the switching controller 41a switched to the air pump mode, whereby ozone is supplied into the exhaust passage 10ex. Thus, the oxidation of NO in the exhaust gas into $NO_2$ can be accelerated. As a result, an amount of NOx that is not adsorbed in the reducing catalyst and released into the atmosphere can be decreased, thereby improving the NOx purification rate.

In the present embodiment, the reducing catalyst includes at least silver. More specifically, the silver catalyst is carried on alumina with which the carrier is coated. By using the silver catalyst, the partial oxidation reaction as shown in FIG. 3 more likely occurs compared to a case where platinum is used as a catalyst. Thus, in the present embodiment where the silver catalyst is used, the NOx purification rate can be improved, as compared to the case where the platinum is used. Especially, the improvement in the NOx purification rate may be remarkably exhibited at a low temperature region of the catalyst temperature Tcat within the activation region where the reducing catalyst is activated.

Furthermore, the reducing agent supplying device according to the present embodiment includes the heater 21 for heating the reducing agent, and the reducing agent, which was heated by the heater 21 to a certain high temperature, is partially oxidized with oxygen contained in air. Accordingly, the partial oxidation of fuel is readily attained, whereby the reformation of the reducing agent is also easily attained. Further, the cracking is generated by heating fuel by the heater 21 to thermally decompose the fuel into a hydrocarbon compound having a small carbon number. Since the hydrocarbon compound having a small carbon number has a low boiling point, vaporized fuel can be suppressed to return to liquid form.

In the present embodiment, the ozone generator 30 is provided, and ozone generated by the ozone generator 30 is supplied when the cool flame reaction occurs. For that reason, the start timing of the cool flame reaction can be advanced, and the cool flame reaction time can be reduced. Hence, even when the reaction container 20 is downsized, and a staying time of the fuel within the reaction container 20 is shortened, the cool flame reaction can be completed within the staying time. Thus, the reaction container 20 can be downsized.

Further, in the present embodiment, when the reducing catalyst temperature Tcat is lower than the activation temperature, ozone generated by the ozone generator 30 is supplied into the air passage 23b while stopping fuel injection by the injector 22, thereby supplying the ozone into the exhaust passage 10ex. Accordingly, the reducing agent can be prevented from being supplied when the reducing catalyst in the NOx purifying device 12 is not activated. Since NO in the exhaust gas is oxidized into $NO_2$ by supplying ozone, and is adsorbed inside the NOx purification catalyst, the NOx adsorbed amount inside the NOx purifying device 12 can increase.

Other Embodiment

In the above-described embodiment shown in FIG. 1, the exhaust pressure sensor 43 is provided, and the exhaust pressure sensor 43 directly detects the exhaust pressure Pex, which is a pressure in the exhaust passage 10ex. However, the exhaust pressure sensor 43 may be eliminated and, the exhaust pressure Pex may be estimated based on, e.g., operating condition of the internal combustion engine 10 or a pressure loss at the DPF 13.

In the above-described embodiment shown in FIG. 1, the catalyst temperature sensor 42 attached to the NOx purifying device 12 is provided, and the catalyst temperature sensor 42 directly detects an ambient temperature of the reducing catalyst (the catalyst temperature Tcat). Alternatively, the catalyst temperature sensor 42 may be eliminated and the catalyst temperature Tcat may be estimated based on, e.g., operating condition of the internal combustion engine 10.

Although, the air pump 30p is disposed in the ozone-containing air pipe 26 upstream of the ozone generator 30 in the above-described embodiment, the air pump 30p may be disposed in the ozone-containing air pipe 26 downstream of the ozone generator 30. Furthermore, in the above-described embodiment shown in FIG. 1, the DPF 13 is disposed in the exhaust passage 10ex downstream of the NOx purifying device 12, but may be disposed upstream of the NOx purifying device 12.

In the above-described embodiment, the first temperature T1 used for the determination at Step 14 in FIG. 5 is set to be lower than the activation temperature. However, the first temperature T1 may be set to be equal to the activation temperature.

The microcomputer 41 (the switching controller 41a) switches between the air pump mode and the full close mode according to the determination result (S12) of the adsorption request based on the catalyst temperature Tcat and the determination result (S15) based on the exhaust pressure Pex. Alternatively, when the adsorption request exists, the microcomputer 41 may set the operation of the reducing agent supplying device to the air pump mode regardless of a value of the exhaust pressure Pex, and in this case, the full close mode at Step 20 may be eliminated.

In the above-described embodiment shown in FIG. 1, the electromagnetic check valve 26v is used, and the operation of the check valve 26v is electrically controlled by the microcomputer 41. Alternatively, a mechanical check valve may be used. The mechanical check valve may include an elastic member that applies a biasing force to the valve body in a direction to close. When a pressure at an upstream side of the valve body is higher than a pressure at a downstream side of the valve body, the valve body may move to open against the biasing force by the elastic member.

Although, in the present embodiment shown in FIG. 1, the adjusting valve 25v and the check valve 26v are separately provided, the adjusting valve 25v and the check valve 26v may be integrally formed. Furthermore, the compressor 11c in the supercharger 11 rotates by kinetic energy of the exhaust gas, but a supercharger having the compressor 11c that rotates by an electric motor may be used.

In the above-described embodiment, the reformation using ozone is executed when the catalyst temperature Tcat is equal to or higher than the activation temperature and lower than the second temperature T2. Alternatively, fuel heated by the heater 21 may be partially oxidized with oxygen supply but without ozone supply, when the catalyst temperature Tcat is equal to or higher than the activation temperature and when the catalyst temperature Tcat is equal to or higher than a third temperature (e.g., 350° C.) that is higher than the second temperature T2. Since fuel is sufficiently partially oxidized without supplying ozone when the catalyst temperature Tcat is equal to or higher than the third temperature, electric consumption at the ozone generator 30 can be reduced by stopping ozone supply. In short, the partial fuel oxidation may be possible even without ozone by heating fuel by the heater 21. However, the reaction shown in FIG. 3 may be accelerated when ozone is used to reform fuel, as described above.

In a case where a cooler for cooling intake air compressed by the compressor 11c is arranged in the intake air passage 10in shown in FIG. 1, it is preferable to connect the compressed air pipe 25 to an upstream side of the cooler to supply intake air without being cooled by the cooler into the reaction container 20. However, the compressed air pipe 25 may be connected to a downstream side of the cooler to supply intake air after being cooled by the cooler into the reaction container 20.

In the above-described embodiment, the reducing catalyst including silver is used, but the reducing agent is not necessarily limited to such a silver catalyst. For example, a catalyst including copper or iron may be used as a reducing catalyst.

In the above-described embodiment shown in FIG. 1, the reducing catalyst that physically adsorbs NOx (i.e., physisorption) is used in the NOx purifying device 12, but a reducing agent that chemically adsorbs NOx (i.e., chemisorption) may be used. One example of such a reducing agent that chemically adsorbs NOx may include a catalyst made of platinum combined with alkaline-earth metal such as barium or alkaline metal such as lithium.

In the above-described embodiment, the reformation is executed such that the ratio of the aldehyde in the reducing agent becomes a specified ratio (e.g., 10%). Alternatively, the reformation may be executed such that the ratio of the aldehyde becomes substantially 100%. Furthermore, the reformed reducing agent may not be limited to a reformed reducing agent including aldehyde. For example, a reducing agent supplying device using alcohol, acetate, carbon monoxide and hydrogen as a partially oxidized compound.

The NOx purifying device 12 may adsorb NOx when an air-fuel ratio in the internal combustion engine 10 is leaner than a stoichiometric air-fuel ratio (i.e., when the engine 10 is in the lean-burn operation) and may reduce NOx when the air-fuel ratio in the internal combustion engine 10 is not leaner than the stoichiometric air-fuel ratio (i.e., when the engine 10 is in non-lean-burn operation). In this case, ozone is generated at the lean-burn operation and the reformed fuel is generated at the non-lean-burn operation. One example of a catalyst that adsorbs NOx at the lean combustion may be a chemisorption reducing catalyst made of platinum and barium carried by a carrier.

In the above-described embodiment shown in FIG. 1, the reducing agent supplying device is applied to the combustion system that is installed in a vehicle. However, the reducing agent supplying system may be applied to a stationary combustion system. Further, in the embodiment shown in FIG. 1, the reducing agent supplying device is applied to a compression self-ignition diesel engine, and diesel for combustion is used as the reducing agent. However, the reducing agent supplying device may be applied to a self-ignition gasoline engine, and gasoline for combustion may also be used for the reducing agent.

Means and functions provided by the microcomputer may be provided by, for example, only software, only hardware, or a combination thereof. The microcomputer may be constituted by, for example, an analog circuit.

What is claimed is:
1. A reducing agent supplying device for a fuel combustion system, the fuel combustion system including a supercharger, which compresses an air and supplies the air to an internal combustion engine, and a NOx purifying device, which is arranged in an exhaust passage to purify, with a reducing catalyst, NOx contained in exhaust gas of the internal combustion engine, the reducing agent supplying device supplying a reducing agent into the exhaust passage at a position upstream of the reducing catalyst, the reducing agent supplying device comprising:
a reaction container that defines a reaction chamber therein in which the reducing agent is reformed by being oxidized with oxygen in air;
an ozone generator that generates ozone from oxygen in air;
an air pump that supplies the air into the ozone generator;

an ozone-containing air pipe through which an ozone-containing air, which is an air containing the ozone generated by the ozone generator, flows toward the reaction chamber;

a compressed air pipe through which a portion of a compressed air, which is the air compressed by the supercharger, flows toward the reaction chamber;

a switching device that switches between an air pump mode, in which the ozone-containing air is supplied into the reaction chamber, and a supercharging mode, in which the compressed air is supplied into the reaction chamber; and a switching controller that controls the switching device based on a catalyst temperature, which is a temperature of the reducing catalyst, and an exhaust pressure, which is a pressure in the exhaust passage.

2. The reducing agent supplying device according to claim 1, further comprising a reducibility determiner that determines, based on the catalyst temperature, whether an reducible state exists where a reduction of the NOx is possible with the reducing catalyst, a first ozone-request determiner that determines, based on the catalyst temperature, whether a first ozone-requested state exists where supply of the ozone-containing air to the reaction chamber is requested during the reducible state, and a first air-pump-effectiveness determiner that determines, based on the exhaust pressure, whether a first low exhaust pressure state where supply of the reducing agent into the exhaust passage by the air pump is possible, wherein the switching controller controls the switching device to switch to the air pump mode when the reducibility determiner determines that the reducible state exists, the first ozone-request determiner determines that the first ozone-requested state exists, and the first air-pump-effectiveness determiner determines that the first low exhaust pressure state exists.

3. The reducing agent supplying device according to claim 2, wherein the switching controller controls the switching device to switch to the supercharging mode when the reducibility determiner determines that the reducible state exists, the first ozone-request determiner determines that the first ozone-requested state exists, and the first air-pump-effectiveness determiner determines that the first low exhaust pressure state does not exist.

4. The reducing agent supplying device according to claim 2, wherein the switching controller controls the switching device to switch to the supercharging mode when the reducibility determiner determines that the reducible state exists and the first ozone-request determiner determines that the first ozone-requested state does not exist.

5. The reducing agent supplying device according to claim 1, further comprising an adsorbability determiner that determines, based on the catalyst temperature, whether an adsorbable state exists where adsorption of the NOx in the reducing catalyst is possible, a second ozone-request determiner that determines, based on the catalyst temperature, whether a second ozone-requested state exists where supply of the ozone-containing air into the exhaust passage is requested during the adsorbable state, and a second air-pump-effectiveness determiner that determines, based on the exhaust pressure, whether a second low exhaust pressure state exists where the supply of the ozone-containing air into the exhaust passage by the air pump is possible, wherein the switching controller controls the switching device to switch to the air pump mode when the adsorbability determiner determines that the adsorbable state exists, the second ozone-request determiner determines that the second ozone-requested state exists, and the second air-pump-effectiveness determiner determines that the second low exhaust pressure state exists.

* * * * *